US006801501B1

(12) United States Patent
Knightly et al.

(10) Patent No.: US 6,801,501 B1
(45) Date of Patent: Oct. 5, 2004

(54) METHOD AND APPARATUS FOR PERFORMING MEASUREMENT-BASED ADMISSION CONTROL USING PEAK RATE ENVELOPES

(75) Inventors: Edward Knightly, Houston, TX (US); Jingyu Qiu, Bellevue, WA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/396,807

(22) Filed: Sep. 14, 1999

(51) Int. Cl.[7] .............................. H04J 3/14; H04L 12/26
(52) U.S. Cl. ..................... 370/233; 370/235; 370/395.4
(58) Field of Search ................. 370/229, 230, 370/230.1, 231, 232, 233, 234, 235, 235.1, 236, 236.1, 253, 395.1, 395.21, 395.4, 395.42

(56) References Cited

U.S. PATENT DOCUMENTS

| | | | | |
|---|---|---|---|---|
| 5,381,407 A | * | 1/1995 | Chao | 370/233 |
| 5,436,894 A | * | 7/1995 | Wallmeier et al. | 370/399 |
| 5,519,689 A | * | 5/1996 | Kim | 370/232 |
| 5,838,663 A | * | 11/1998 | Elwalid et al. | 370/233 |
| 5,872,771 A | | 2/1999 | Park et al. | |
| 6,046,983 A | * | 4/2000 | Hasegawa et al. | 370/236.1 |

OTHER PUBLICATIONS

"Supporting Real–Time Applications in an Integrated Services Packet Network: Architecture and Mechanism", Clark et al., *Sigcomm '92 Conference Proceedings*, Baltimore, Maryland, Aug. 1992, pp. 14–26.
"A Calculus for Network Delay, Part I: Network Elements in Isolation", Rene L. Cruz, *IEEE Transactions On Information Theory*, vol. 37, No. 1, Jan. 1991, pp. 114–131.
"A Framework for Bandwidth Management in ATM Networks—Aggregate Equivalent Bandwidth Estimation Approach", Dziong et al., *IEEE/ACM Transactions On Networking*, vol. 5, No. 1, Feb. 1997, pp. 134–147.
"A Scheme for Real–Time Channel Establishment in Wide–Area Networks", Ferrari and Verma, *IEEE Journal of Selected Areas in Communications*, vol. 8, No. 1, Apr. 1990, pp. 368–379.
"Comments on Measurement–based Admissions Control for Controlled–Load Services", Sally Floyd, *Lawrence Berkeley National Laboratory*, Jul. 9, 1996, 16 pages.
"Link–sharing and Resource Management Models for Packet Networks", Floyd and Jacobson, *IEEE/ACM Transactions on Networking*, vol. 3, No. 4, Aug. 1995, pp. 365–386.
"Analysis, Modeling and Generation of Self–Similar VBR Video Traffic", Garrett and Willinger, *Proceedings of ACM SIGCMM '94*, London, U.K., Aug. 1994, pp. 269–280.
"A Decision–Theoretic Approach to Call Admission Control in ATM Networks", Gibbens et al., *IEEE Journal on Selected Areas in Communications*, vol. 13, No. 6, Aug. 1995, pp. 1101–1114.

(List continued on next page.)

*Primary Examiner*—Chau Nguyen
*Assistant Examiner*—Soon-Dong Hyun
(74) *Attorney, Agent, or Firm*—Squire, Sanders & Dempsey, L.L.P.

(57) ABSTRACT

A method and apparatus for performing measurement-based admission control using peak rate envelopes is disclosed. A peak rate envelope estimator that uses empirical traffic envelopes of the aggregate traffic flow to allocate resources. Connection requests from the user are accepted or denied based upon the empirical traffic envelopes of the aggregate traffic flow.

33 Claims, 11 Drawing Sheets

OTHER PUBLICATIONS

"Dynamic Bandwidth Allocation for ATM Switches", Hsu and Walrand, *Journal of Applied Probability*, vol. 33, No. 3, Sep. 1996, pp. 758–771.

"A Measurement–Based Admission Control Algorithm for Integrated Service Packet Networks", Jamin et al., *IEEE/ACM Transactions on Networking*, vol. 5, No. 1, Feb. 1997, pp. 56–70.

"D–Bind: An Accurate Traffic Model for Providing QoS Guarantees to VBR Traffic", Knightly and Zhang, *IEEE/ACM Transactions on Networking*, vol. 5, No. 2, Apr. 1997, pp. 219–231.

"Control of Resources in Broadband Networks with Quality of Service Guarantees", Lazar and Pacifici, *IEEE Communications Magazine*, vol. 30, No. 10, Oct. 1991, pp. 66–73.

"Modeling Video Sources for Real–Time Scheduling", Lazar et al., *IEEE Global Telecommunications Conference*, Nov. 29–Dec. 2, 1993, pp. 835–839.

"Measurement–Based Admission Control in Integrated Services Networks", Jingyu Qiu, Master of Science Thesis, Apr. 1998, 45 pages.

"Statistical properties of MPEG video traffic and their impact on traffic modeling in ATM systems", O. Rose, $20^{th}$ *Conference on Local Computer Networks*, Oct. 16–19, 1995, pp. 397–406.

"Measurement–based Call Admission Control: Analysis and Simulation", Tse and Grossglauser, *IEEE Infocom '97*, vol. 3, Apr. 7–12, pp. 981–989.

"Deterministic Delay Bounds for VBR Video in Packet–Switching Networks: Fundamental Limits and Practical Trade–Offs", Wrege et al., *IEEE/ACM Transactions on Networking*, vol. 4, No. 3, Jun. 1996, pp. 352–362.

* cited by examiner

METHOD AND APPARATUS FOR PERFORMING MEASUREMENT-BASED ADMISSION CONTROL USING PEAK RATE ENVELOPES

BACKGROUND OF THE INVENTION

1. Field of the Invention

This invention relates in general to packet networks, and more particularly to a method and apparatus for performing measurement-based admission control using peak rate envelopes.

2. Description of Related Art

Packet networks are fundamental element of the Internet and other IP-based WANs. The Internet is increasingly becoming a medium for converging traffic as diverse as data, video, audio, and voice over IP (VOIP). Multimedia network applications involve real-time transmission of data, voice, and video over networks. Some existing applications are video conferencing, multimedia virtual presentation, video-on-demand, and network games. These applications present new challenges to the current networking technology.

For example, multimedia applications have much higher data volume than email and file transfer. The current Internet does not support bandwidth reservation, therefore there is no guarantee that such amount of bandwidth is available when needed. Further, most multimedia data, especially video, are compressed and encoded to decrease the redundancy of data. This creates Variable Bit Rate (VBR) data, which presents another challenge to the networks because the bandwidth need of an application varies over time. Accordingly, the amount of the reserved bandwidth either has to be the peak bandwidth, i.e., the peak-rate reservation, or has to be changed over time to reflect the variability of traffic. Reserving for the peak bandwidth results in waste of bandwidth because the reserved peak bandwidth is not utilized all the time. However, changing the bandwidth reservation over time is much more difficult to accomplish. In addition, multimedia applications are delay-sensitive and loss-sensitive by nature. Most multimedia applications require an explicit delay bound on their transmitted packets because of delay-sensitivity. For example, the delay bound of a live video transmission is related to the receiver's latest playback time: if the packets arrive beyond that point, they may be useless for the receiver. The delay bound also varies from one application to another due to the differences in their delay-sensitivities and playback environment setups.

While, ATM was designed with different types of quality of service (QoS) categories in mind, the Internet has historically offered a single level of service, which is often referred to as "best effort." Best effort service merely ensures that all data packets are treated with equity in the network. However, because of the network dynamics, the Internet does not offer a guaranteed level of service quality, but rather some Internet connections exhibit high levels of congestion that result in poor quality, while other Internet connections exhibit consistent levels of high quality service. Thus, IP, as a connectionless protocol, is not a technology that was initially designed for quality of service. New standards such as RSVP, 802.1q and MPOA are attempting to address this shortcoming, either in various transport environments or native to IP.

To satisfy the QoS requirements of real-time multimedia applications, networks must employ resource reservation and admission control techniques. To develop an admission control method, the necessary prerequisites for being able to promise any QoS in packet networks and what the QoS requirements of different user applications must be defined. Note that the term packet network, as used herein, also covers the term cell network, since a cell is a packet of fixed size.

The QoS in packet networks can be defined with delay, delay variation and packet loss ratio experienced by the packet flow of the user. Any packet network providing explicit QoS promises must somehow take care that the total amount of traffic sharing the same resource, like bandwidth of a link, does not exceed a certain level which would cause buffer overflow or does not require queues that are too long thereby resulting in either violation of packet loss or delay promises. Obviously, conforming to QoS promises is a matter of queue behavior estimation. In order to estimate the behavior of packet queues, the network needs to know something about the statistics of traffic sent through connections. Therefore the user and the network must make some kind of traffic contract, including a description of the traffic source, at least. In the simplest case, the network provides the same QoS for all connections and the traffic contract contains only the source traffic description. In a more sophisticated case, the user specifies the QoS level needed; giving requested upper bounds for the delay, the delay variation and the packet loss. In ATM, the sophisticated contract is being used.

Still, there is a possibility of a violation of QoS promises. The traffic contract itself does not prevent a malicious user from sending more traffic than contracted. If the connection is charged according to the contracted traffic rate, then the violation of the contract is tempting. In the worst case, one malicious user can cause violation of the promised QoS of every connection. To avoid this, the network may perform packet level traffic control.

The main purpose of the connection admission control procedure is to protect the user and the network so that the agreed QoS is achieved and the usage of network is optimized. Thus, the connection admission control is a set of actions taken by the network during the call set-up phase in order to determine whether a connection request can be accepted or rejected. Admission control within the network should effectively control the admitted applications so that the existing applications' QoS are not violated.

To increase bandwidth usage where multiple flows are competing for network resources, statistical multiplexing is often used. Statistical multiplexing is a bandwidth management feature that makes full use of network's capacity by dynamically allocating bandwidth to applications only when they actually have traffic to send. This type of multiplexing of traffic streams differs a lot from time division multiplexing currently used in telephone networks. Due to the asynchronous nature of the network, packets from more than one incoming link may arrive concurrently and in that case, the most important packets must be carried and the others must be queued. Basically, networks consist of a number of switches and each switch of a number of queues, and every queue in the network is dependent of several other queues. The role of admission control in the network is to maximize the performance of a switch according to chosen overall policy.

As suggested above, two QoS parameters are fundamental to admission control: maximum delay and the probability of violating the maximum delay. Clearly packets must not be queued longer than the QoS parameters allow. From the queue service rate and the maximum delay allowed, the maximum queue length allowed may be calculated as follows:

$$\text{maximum queue length} = \frac{\text{maximum delay}}{\text{service rate of the queue}}$$

Some buffer space for queue is always needed when the aggregate arrival rate of the connections exceeds the service rate of the queue. The admission control must ensure that the peaks of the aggregate arrival rate results in only a small probability of exceeding the maximum queue length allowed. This probability must be equal to or smaller than the probability of violating the maximum delay. Secondly, the packet loss ration requirements of the connections must be fulfilled.

The admission control ensures that the maximum delay or the packet loss ratio does not exceed given bounds using either preventive admission control or measurement-based admission control. Preventive admission control is a more traditional admission control method that relies on the parameters of the source traffic descriptor and calculates the queue length or cell loss ratio for the case the new connection is accepted.

In contrast, measurement-based admission control (MBAC) measures the current traffic and then calculates the effect of the new connection. Both admission control methods then accept the new connection only if given bounds are not exceeded.

Traditional approaches to resource reservation, however, require that an accurate characterization of each flow be specified at flow setup time, a requirement that, in practice, may be difficult for many "live" applications to meet. This is especially problematic for applications that exhibit rate variations over multiple time scales, because this behavior is not adequately characterized by standard traffic models such as the leaky bucket.

Measurement-based service is a technique for supporting applications with ill-specified traffic characteristics. By basing admission control decisions on measured values of traffic parameters rather than a priori client specified guesses, the effects of mistaken client traffic characterizations are largely alleviated, as is the need for a traffic model which captures the exact multiple time scale behavior of each traffic flow.

Previous approaches to measurement-based admission control have employed a number of measurement methodologies to characterize traffic including instantaneous peak rate, the instantaneous rate's mean and variance or moment generating function, and per-flow statistics. In addition, a number of theoretical techniques have been applied to study various aspects of measurement-based admission control including large deviations theory, Gaussian modeling, Hoeffding bounds, and decision theory.

However, previous approaches to measurement-based admission control do not adequately characterize traffic and capture the aggregate flow's interval-based behavior. Moreover, Gaussian approximations may not be applicable to the traffic flows thereby causing prior approaches to measurement-based admission control to provide unacceptable QoS.

It can be seen that there is a need for an improved measurement-based connection admission control method and apparatus.

It can also be seen that there is a need for a measurement-based connection admission control method and apparatus that is able to characterize traffic and capture the aggregate flow's interval-based behavior.

It can also be seen that there is a need for a measurement-based connection admission control method and apparatus that can control QoS for a buffered multiplexer servicing a broad class of underlying traffic types, including cases of moderate numbers of traffic flows in which Gaussian approximations may not be applicable.

SUMMARY OF THE INVENTION

To overcome the limitations in the prior art described above, and to overcome other limitations that will become apparent upon reading and understanding the present specification, the present invention discloses a method and apparatus for performing measurement-based admission control using peak rate envelopes.

The present invention solves the above-described problems by providing a peak rate envelope estimator that uses empirical traffic envelopes of the aggregate traffic flow to allocate resources. Connection requests from the user are accepted or denied based upon the empirical traffic envelopes of the aggregate traffic flow.

A method in accordance with the principles of the present invention includes a measuring a packet rate of an aggregate flow to obtain a maximal rate envelope and performing admission control for a new connection based upon the maximal rate envelope.

Other embodiments of a method in accordance with the principles of the invention may include alternative or optional additional aspects. One such aspect of the present invention is that the performing admission control further includes using the maximal flow rate to calculate a schedulability condition and admitting a new connection based upon the schedulability condition.

Another aspect of the present invention is that the method further includes quantifying an uncertainty associated with the schedulability condition.

Another aspect of the present invention is that the quantifying is based upon the variation of a previous maximal rate envelope measurement and uncertainty of a future packet rate.

Another aspect of the present invention is that the uncertainty of the future packet rate is based upon a packet loss probability reflecting a mean number of packets lost when the future arriving packet exceed a past measured maximal rate envelope.

Another aspect of the present invention is that the schedulability condition includes a no packet loss condition for a new flow, bounded by $\pi_k$, k=1, . . . T, requesting admission to a first-come-first-serve server with capacity C, buffer size B, and a workload characterized by a maximal rate envelope with mean $\overline{R}_k$ with variance $\sigma_k^2$, k=1, . . . , T, and a confidence level $\Phi(a)$, the no packet loss condition defined according to $$\max_{k=1,2,\ldots,T-1} \{k\tau(\overline{R}_k + a\sigma_k + \tau_k - C)\} \le B \text{ and } \overline{R}_T + a\sigma_T + \tau_T \le C.$$

Another aspect of the present invention is that $$\max_{k=1,2,\ldots,T-1} \{k\tau(\overline{R}_k + a\sigma_k + \tau_k - C)\} \le B$$

ensures that the maximal buffer occupancy is smaller than the buffer size.

Another aspect of the present invention is that $\overline{R}_T + a\sigma_T + \tau_T \le C$ is a stability condition for ensuring that the mean rate over intervals of length T is less than link capacity with confidence level $\Phi(\alpha)$, so that the busy period is less than T also with probability $\Phi(\alpha)$.

Another aspect of the present invention is that the admission control includes checking for an aggregate schedulability condition with an associated prediction confidence level, determining the packet loss probability based upon a measured variance of the maximal rate envelope and admitting a new connection when estimated future performance parameters satisfy requested quality of service requirements.

Another aspect of the present invention is that future performance parameters satisfy requested quality of service requirements if an expected packet loss bounding rate is greater than a predetermined value when the aggregate schedulability condition with an associated confidence level fails to hold.

Another aspect of the present invention is that the packet loss probability for an aggregate traffic flow that satisfies the schedulability condition $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C,$$

and has mean bounding rate $\overline{R}_k$ and variance $\sigma_k^2$ over intervals of length $k\tau$, for a link capacity C, buffer size B, and schedulability confidence level $\Phi(\alpha)$ is bounded by $$\max_{k=1,2,\ldots,T} \frac{\sigma_k \Psi(\alpha) \cdot I_k}{\overline{R}_T \cdot T_\tau} \leq P_{loss} \leq \max_{k=1,2,\ldots,T} \frac{\sigma_k \Psi(\alpha)}{\overline{R}_T},$$

where $\Psi(\alpha) = \delta_0 e^{-\frac{\alpha-\lambda_0}{\delta_0}}$.

Another aspect of the present invention is that the maximal rate envelope captures an aggregate flow's interval based behavior.

Another aspect of the present invention is that the measuring the packet rate updates a recent aggregate envelope and quantifies a temporal variation for the maximal rate envelope.

Another aspect of the present invention is that the measuring the packet rate further including setting an interval length for flow rate measurements and determining a peak packet rate over the set interval length.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a measurement-based admission control method and apparatus that utilizes measured values of aggregate traffic envelopes. The measurement-based admission control method and apparatus measures flow parameters and performs admission control. The measurements are used to continually update the recent empirical aggregate envelope and the envelope's temporal variation. The admission control, invoked upon arrival of a new flow's admission request, conceptually consists of two parts. First, aggregate schedulability with an associated prediction confidence level is checked, and second, the packet loss probability is determined. The new flow is admitted if the estimated future performance parameters satisfy the QoS requirements of all flows.

Figure 1:
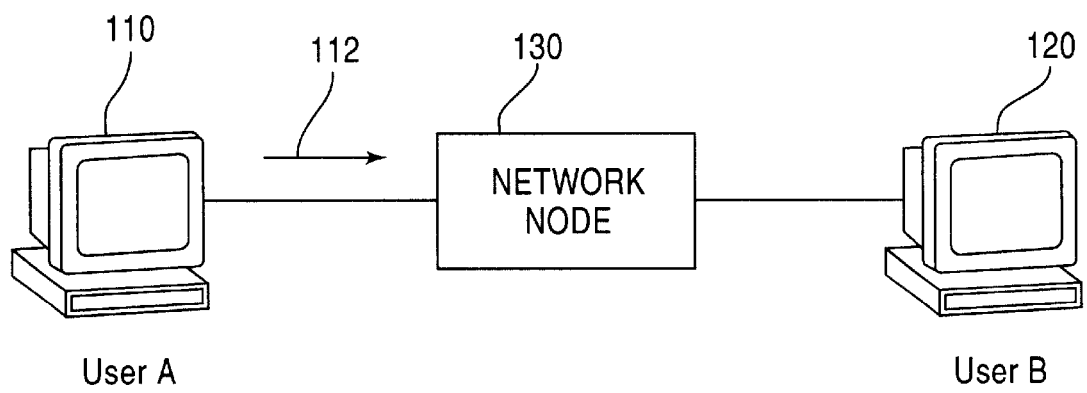
FIG. 1 illustrates connection admission controls.

Traffic management is performed at two stages of a connection. First, connection admission control is used at connection setups to accept or deny a request for a connection. Then, traffic management is performed during the life of the connections through flow control. FIG. 1 illustrates connection admission controls. In FIG. 1, user A 110 requests a connection to user B 120 through network node 130. The connection request 112 send by User A 110 identifies the parameters of the desired connection, e.g., traffic and quality of service (QoS) parameters.

Those skilled in the art will recognize that the term packet network is used broadly because cells are merely packets of a fixed size. Nevertheless, herein ATM will be used to describe traffic/QoS parameters. However, those skilled in the art will recognize that a cell is merely a fixed size packet, and thus ATM is an example of a packet network system. In ATM, there are, in general, seven traffic/QoS parameters: cell loss, cell transfer delay (CTD), peak cell rate (PCR), cell delay variation (CDV), sustained cell rate (SCR), maximum burst size (MBS) and control information. The cell loss parameter indicates the number of cells that are lost per second. The CTD indicates the delay encountered during transmission. The PCR identifies the maximum cell rate the interface will accept. The CDV indicates to what extent CTD may change. The SCR is the average cell rate. The MBS represents the number of cells that can burst above the SCR. Finally, the control information indicates whether congestion control is used.

Figure 2:
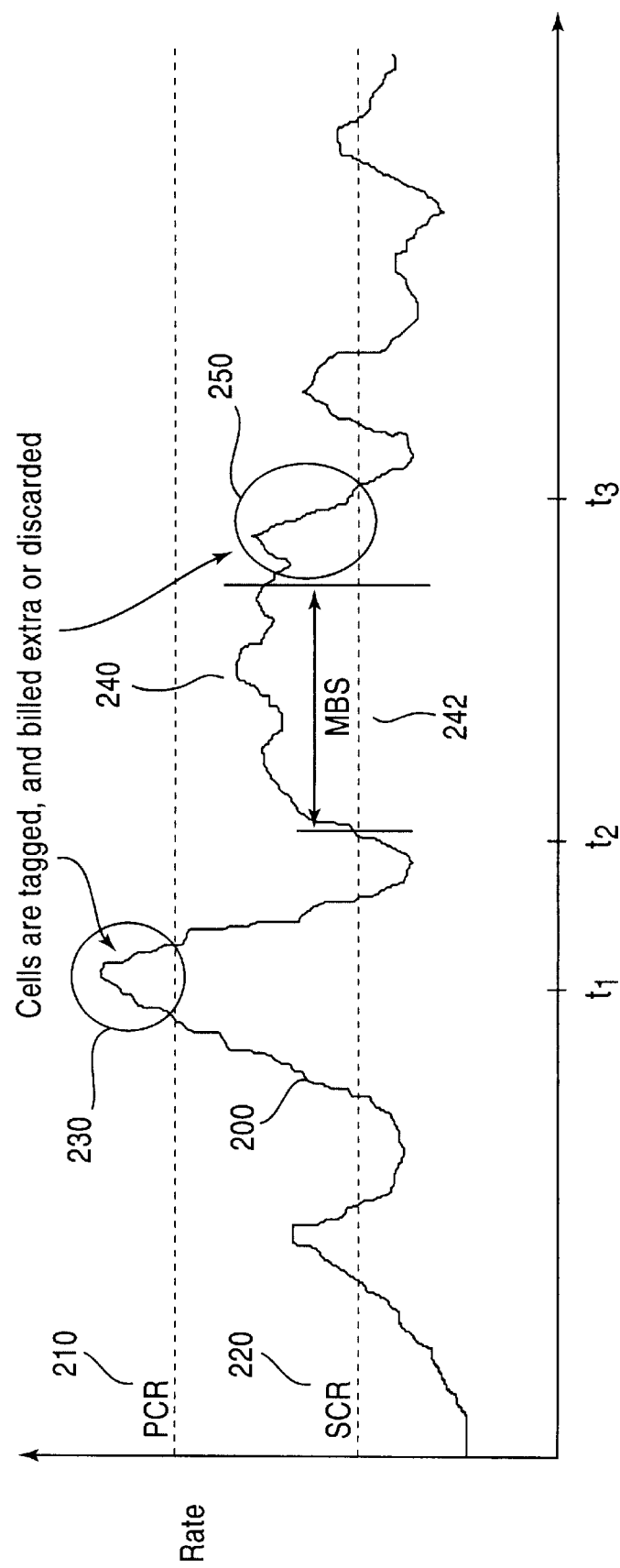
FIG. 2 illustrates the above-identified traffic/QoS parameters.

FIG. 2 illustrates the above-identified traffic/QoS parameters. FIG. 2 shows a plot of cell rate 200 over time. In FIG. 2, the PCR 210 and SCR 220 are shown relative to the cell rate plot 200. At time $t_1$, a first portion of the plot 230 exceeds the PCR 210. The cells associated with the first portion of the plot 230 are tagged as low priority cells and are discarded or the system may charge a surcharge if bandwidth is available for transmitting these cells. From time $t_2$ to $t_3$, a sustained burst 240 greater than the sustained cell rate is shown. The sustained burst 240 exceeds the MBS 242, thus cells for the portion 250 of the sustained burst 240 are tagged as low priority cells and are discarded or the system may charge a surcharge if bandwidth is available for transmitting these cells. A cell that is tagged has its CLP bit set to 1.

To satisfy the QoS requirements of real-time multimedia applications, networks must employ not only admission control but resource reservation also. Traditional resource reservation techniques require the specification of an accurate characterization of each flow at flow setup time. However, many live applications cannot satisfy this requirement. Thus, an adaptive technique must be used. The present invention uses an adaptive measurement of the aggregate rate envelope.

In characterizing a flow's rate, an associated interval length must also be specified. For example, denoting $A[s, s+I_k]$ as a flow's arrivals in the interval, $s, s+I_k$, $A[s,s+I_k]/I_k$ is the rate in this particular interval. Moreover, the peak rate over any interval of length $I_k$ is given by $R_k = \max_s A[s,s,+I_k]/I_k$. The set of rates $I_k$ bound the flow's rate over intervals of length $I_k$ as a maximal rate envelope.

Figure 3:
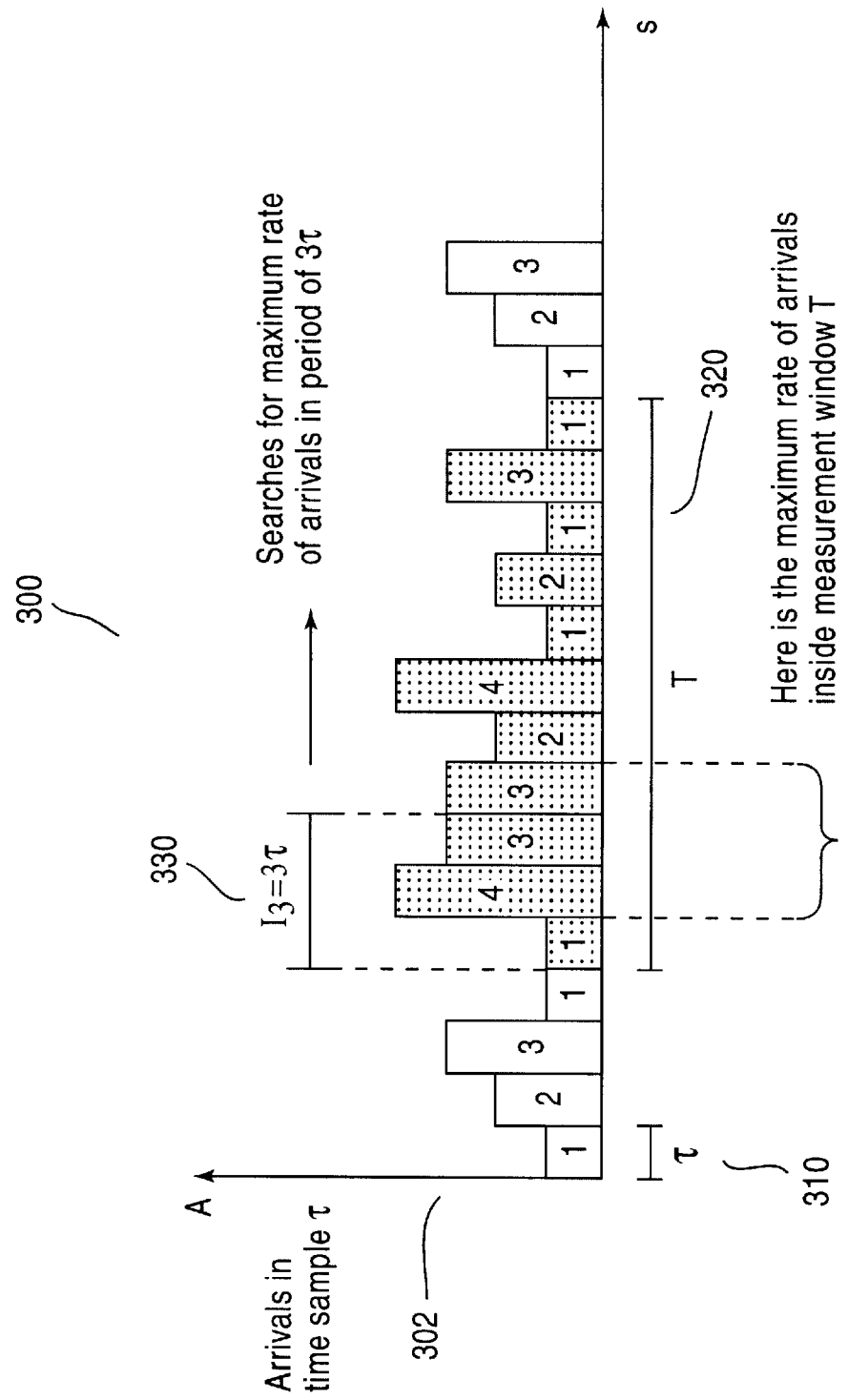
FIG. 3 illustrates an example of measuring the peak rate for an envelope according to the present invention.

FIG. 3 illustrates an example of measuring the peak rate for an envelope 300 according to the present invention. In FIG. 3, the cell arrival rate 302 for small time periods 310, $\tau$, is plotted. The peak rate is calculated for the measurement window T 320. Within measurement window T 320, an interval of $3\tau$ 330 is used for the calculation of the peak rate. Accordingly, the peak rate for measurement window T is $$\frac{10}{3\tau}.$$

Figure 4:
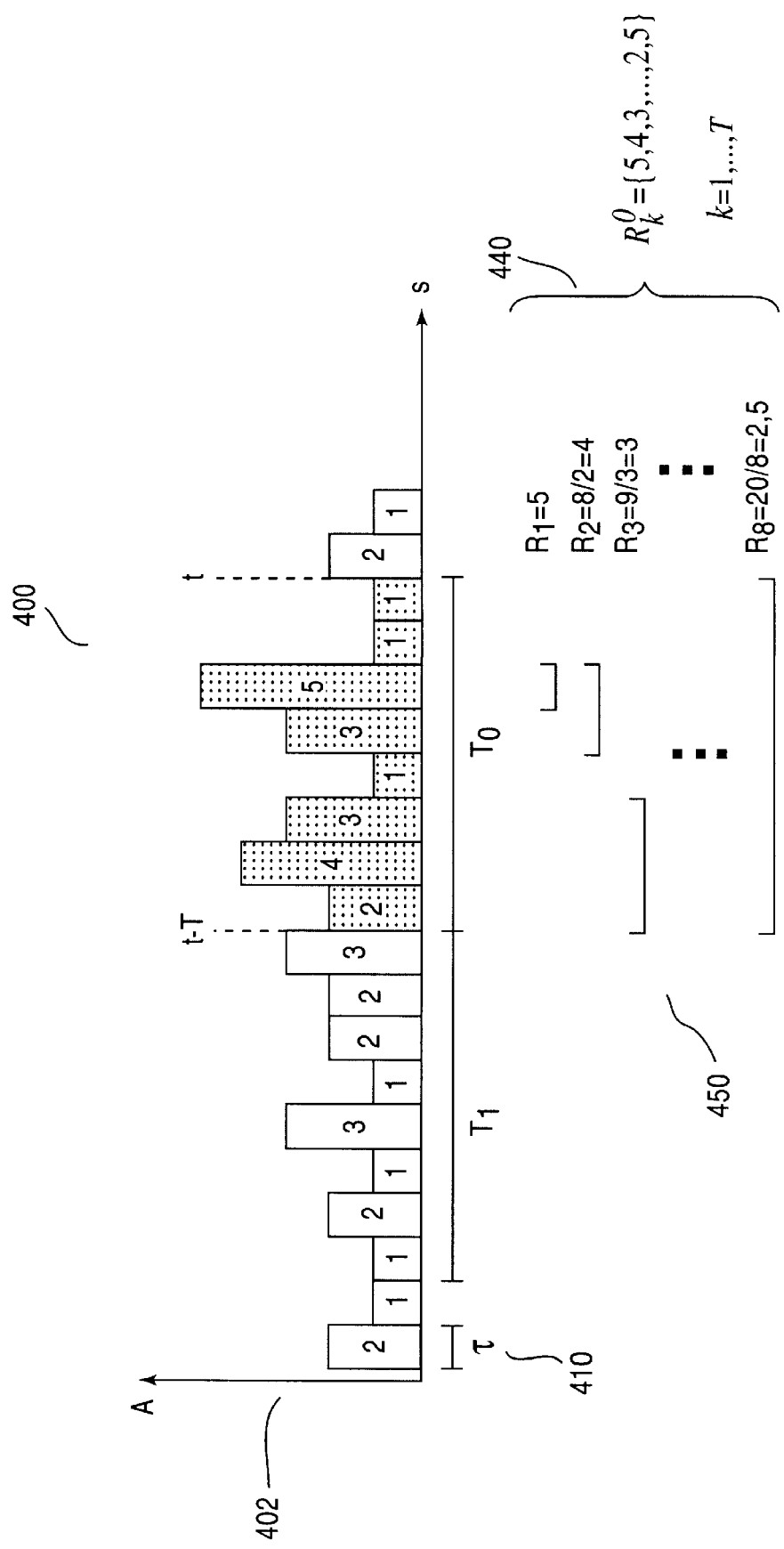
FIG. 4 illustrates an example of measuring a maximal rate envelope according to the present invention.

FIG. 4 illustrates an example of measuring a maximal rate envelope 400 according to the present invention. Again, the cell arrival rate 402 for small time periods 410, $\tau$, is plotted. In FIG. 4, the behavior of the traffic flow is described by its maximal rates 440 over numerous intervals 450 of different lengths. The goal of the measurement according to the present invention is two fold. First, by measuring an envelope of the aggregate flow, the short time scale burstiness of the traffic can be captured, which can then be used to analyze the dynamics of a buffered multiplexer with admission of a new flow. Second, the variation of the aggregate rate envelope is measured to characterize measurement errors and longer time scale fluctuations in the traffic characteristics. Using the variance of the measured envelope, the confidence values of the schedulability condition can be determined and the expected fraction of packets dropped should the schedulability condition fall to hold can be estimated.

Assuming that time is slotted with width $\tau = I_1$, which is the minimum interval of the measured rate envelope (may be larger than the packet transmission time). Denoting $a_t$ as the aggregate arrivals in time t such that $a_t = A[t\tau, (t+1)\tau]$, the maximal rate envelope is defined over the past T time slots from the current time t as $$R_k^1 = \frac{1}{k\tau} \max_{t-T+k \leq s \leq t} \sum_{u=s-k+1}^{s} a_u \quad (1)$$

for $k=1, \ldots, T$. Thus, the envelope $R_k^1, k=1, \ldots T$ describes the aggregate maximal rate envelope over intervals of length $I_k = k\tau$ in the most recent $T\tau$ seconds. This envelope measures the short-time scale burstiness and autocorrelation structure of the aggregate flow.

Every T time slots, the current envelope $R_k^1$ is measured using Equation (1) and $R_k^n \leftarrow R_k^{(n-1)}$ for $k=1, \ldots, T$ and $n=2, \ldots, N$. Thus, the variance of the measured envelopes over the past M windows of length T can be computed as $$\sigma_k^2 = \frac{1}{M-1} \sum_{m=1}^{M} (R_k^m - \overline{R_k})^2 \quad (2)$$

where $\overline{R_k}$ is the empirical mean of the $R_k^m$'s, $\Sigma_m R_k^m / M$. Thus, we measure the variability of the aggregate envelope over $T \cdot M$ time slots to characterize the variation of the envelope itself over longer time scales.

From Equations (1) and (2), the maximal rate envelope of the aggregate traffic may be adaptively measured. Unlike the case of deterministic service in which the envelope is bounded a priori, the measurement-based traffic envelope should be viewed as random for measurement-based admission control. Extreme value theory is used to obtain insights into the behavior of the maximal rate envelope and serves as a theoretical framework to characterize the temporal variation of the measured peak rates.

In considering the application of extreme value theory, consider a sequence $X_1, X_2, \ldots$ of independent and identically distributed random variables with distribution $F_x$. The maximum of n $X_i$ has distribution $$P\left(\max_{1 \leq i \leq n} X_i \leq x\right) = F^n(x). \quad (3)$$

Extreme value theory addresses the asymptotic distribution of $\max_{1 \leq i \leq n} X_i$. Analogous to how the central limit theorem describes the distribution of sums of random variables without requiring knowledge of their exact underlying distributions, extreme value theory describes the distribution of the extremes of sequences of random variables for a general class of underlying distributions. In particular, for a large class of distributions $F_x$, including Gaussian, exponential, log-normal, Gamma, Gumbel, and Raleigh distributions, $$\lim_{n \to \infty} P\left(\max_{1 \leq i \leq n} X_i \leq x\right) = \exp\left[-\exp\left(-\frac{x-\lambda}{\delta}\right)\right] \quad (4)$$

where $$\exp\left[-\exp\left(-\frac{x-\lambda}{\delta}\right)\right]$$

is a Gumbel distribution with mean $\mu = \lambda + 0.57772\delta$, and variance $\sigma^2 = \pi^2 \delta^2 / 6$. Moreover, even if $X_1, X_2, \ldots$ are dependent for most correlation structures and the same class of distributions above, the asymptotic distribution of $P(\max_{1 \leq i \leq n} X_i \leq x)$ is still Gumbel.

Upon arrival of a new flow request, a test for "aggregate schedulability" is first performed. This test is quite different from a strictly worst-case analysis, and ensures that for a certain confidence level, no packet loss will occur if the new flow is admitted. The confidence level is required here since there is no a priori assurance that the past envelope will continue to bound the aggregate flow, as is the case in a deterministic approach.

For a new flow, bounded by $\pi_k$, k=1, . . . T, requesting admission to a first-come-first-serve server with capacity C, buffer size B, and a workload characterized by a maximal rate envelope with mean $\overline{R}_k$ with variance $\sigma_k^2$, k=1, . . . , T, and with a confidence level $\Phi(\alpha)$, no packet loss will occur with admission of the new flow if $$\max_{k=1,2,\ldots,T-1} \{k\tau(\overline{R}_k + \alpha\sigma_k + \tau_k - C)\} \le B \quad (5)$$

and $$\overline{R}_T + \alpha\sigma_T + \tau_T \le C \quad (6)$$

Equation (5) considers the buffer dynamics of the multiplexer and ensures that the maximal buffer occupancy is smaller than the buffer size. Equation (6) is a stability condition, as it ensures that the mean rate over intervals of length T is less than link capacity with confidence level $\Phi(\alpha)$, so that the busy period is less than T also with probability $\Phi(\alpha)$.

For an interval of length T, the distribution of the maximal rate $R_k$ is denoted by $F_k(\cdot)$. With probability $\Phi(\alpha) = \int_\infty^{\overline{R}+\alpha\sigma_k} dF_k$, the future aggregate flow, denoted by A[st,t], satisfies $$P\left\{\max_x A[s, s+k\tau]/k\tau \le \overline{R}_k + \alpha\sigma_k\right\} = \Phi(\alpha) \quad (7)$$

Since $$\max_s \{A[s, s+t] + \hat{A}[s, s+t]\} \le \max_s A[s, s+t] + \max_x \hat{A}[s, s+t], \quad (8)$$

the rate envelope of the past aggregate flow multiplexed with the new flow is bounded by $(\overline{R}_k + \tau_k + \alpha\sigma_k)$, k=1,2, . . . , T, also with probability $\Phi(\alpha)$. Therefore, with this bound on the envelope of the aggregate flow that includes the new flow, the maximum queue length will be bounded by Equation (5) with probability $\Phi(\alpha)$.

From extreme value theory, $R_k$ is approximated having a Gumbel distribution with mean $\overline{R}_k$ and variance $\sigma_k^2$ so that the parameters of the Gumbel distribution $\lambda$ and $\delta$ can be obtained from the sample mean and variance of the maximal rate envelope as $\delta = \sqrt{6}\sigma_{k/\pi}$ and $\lambda = \overline{R}_k + 0.57772\delta$. Thus, the schedulability confidence level is $$\Phi(\alpha) = \exp\left(-\exp\left(-\frac{\alpha - \lambda_0}{\delta_0}\right)\right) \quad (9)$$

where $\delta_0 = \sqrt{6/\pi}$ and $\lambda_0 = 0.57772\delta$. However, those skilled in the art will recognize that other distributions other than Gaussian distributions can be used to approximate $\Phi(\alpha)$.

From Equations (5) and (6), and by applying extreme value theory, the distribution of the maximal rate envelope has been approximated for a wide class of (unknown) underlying traffic distributions. The rate envelope captures the temporal correlation structure of the aggregate flow for intervals up to T seconds.

Further, a new flow is not required to specify a complete rate envelope. For example, if only an estimate of a single rate is known at flow setup time, then the source may specify this value of the peak rate ($\tau_1$) for all of the $\tau_k$'s. If instead the source characterizes its traffic with the standard dual leaky bucket model using parameters (P, $\sigma$, $\rho$), then its maximal rate over intervals of length $I_k$ is given by $$\tau_k = \frac{1}{I_k}\min(PI_k, \sigma + pI_k) \quad (10)$$

Still further, even with a modest number of multiplexed flows, $\overline{R}_k + \alpha\sigma_k \gg \tau_k$. Consequently, if a new flow mischaracterizes its traffic parameters, the impact on the schedulability condition is relatively minor. Note further that specified traffic parameters (correct or not) for previously admitted flows are unused in the test as the impact of these flows on network performance is measured via the aggregate envelope.

Finally, despite the use of a maximal rate envelope, the extent to which sources statistically multiplex is measured and exploited. For example, if flows happened to synchronize in a worst-case manner, then the measured envelope would be exactly the sum of the individual envelopes of Equation (10). However, when flows are statistically independent and economies of scale are present, in practice, $\overline{R}_k + \alpha\sigma_k$, the rate envelope of the aggregate process will be significantly less than the sum of the individual worst-case envelopes.

As described above, the maximal rate of the aggregate flow over intervals of length $I_k$ has mean $\overline{R}_k$ and variance of $\sigma_k^2$ as given by past measurements. Equations (5) and (6) present a no-loss schedulability condition that is satisfied with probability $\Phi\alpha$. However, if the future aggregate rate envelope exceeds $\overline{R}_k\alpha\sigma_k$ then packet loss may occur, and the fraction of packets lost, or the packet loss probability, may be calculated as follows.

For an aggregate traffic flow that satisfies the schedulability condition of Equations (5) and (6), and has mean bounding rate $\overline{R}_k$ and variance $\sigma_k^2$ over intervals of length $k\tau$, for a link capacity C, buffer size B, and schedulability confidence level $\Phi(\alpha)$, the packet loss probability is bounded by $$\max_{k=1,2,\ldots,T} \frac{\sigma_k \Psi(\alpha) \cdot I_k}{\overline{R}_T \cdot T_\tau} \le P_{loss} \le \max_{k=1,2,\ldots,T} \frac{\sigma_k \Psi(\alpha)}{\overline{R}_T} \quad (11)$$

where $$\Psi(\alpha) = \delta_0 e^{-\frac{\alpha - \lambda_0}{\delta_0}} \quad (12)$$

If $\tilde{R}_k = \overline{R}_k + \alpha\sigma_k$, from Equations (5) and (6), no packet loss will occur unless the future bounding rate $R_k$ exceeds $\tilde{R}_k$ for some k=1, . . . T, which occurs with probability 1−$\Phi\alpha$. For a particular k and exceeding rate $\tilde{R}_k$, the mean number of packets lost or dropped due to buffer overflow, denoted by $L_k$, satisfies $$E(R_k - \tilde{R}_k)^+ \cdot I_k \le E(L_k) \le E(R_k - \tilde{R}_k)^+ \cdot T\tau \quad (13)$$

where $$E(R_k - \overline{R}_k)^+ = \int_R^\infty (\tau - \overline{R}_k) dF_k \quad (14)$$

-continued $$= \sigma_k \int_\alpha^\infty (x-\alpha) \frac{1}{\delta_0} \exp\left(-\frac{x-\lambda_0}{\delta_0} - \exp\left(-\frac{x-\lambda_0}{\delta_0}\right)\right) dx$$

$$\approx \sigma_k \int_\alpha^\infty (x-\alpha) \frac{1}{\delta_0} \exp\left(-\frac{x-\lambda_0}{\delta_0}\right) dx$$

$$= \sigma_k \delta_0 e^{-\frac{\alpha-\lambda_0}{\delta_0}}$$

The fraction of packets lost is the ratio of the number of violating packets to the total number of packets sent. Considering all interval lengths k, the loss probability satisfies $$\max_{k=1,2,\ldots,T} \frac{E(R_k - \overline{R}_k)^+ \cdot I_k}{\overline{R}_T \cdot T\tau} \leq P_{loss} \leq \max_{k=1,2,\ldots,T} \frac{E(R_k - \overline{R}_k)^+ \cdot T\tau}{\overline{R}_T \cdot T\tau} \quad (15)$$

$$\max_{k=1,2,\ldots,T} \frac{\sigma_k \cdot \Psi(\alpha) \cdot I_k}{\overline{R}_T \cdot T\tau} \leq P_{loss} \leq \max_{k=1,2,\ldots,T} \frac{\sigma_k \cdot \Psi(\alpha)}{\overline{R}_T}$$

from Equations (11) and (12) and the fact that Prob $(R_k > \tilde{R}_k) \leq 1 - \Phi(\alpha)$.

Thus, Equations (11) and (12) bound the loss probability by determining the mean number of packets that are dropped due to buffer overflow when the schedulability condition of Equations (5) and (6) are not satisfied, a condition which has probability $1-\Phi\alpha$.

The maximal rate envelope may be used to capture the important multiplexing properties of the traffic flows.

Figure 5:
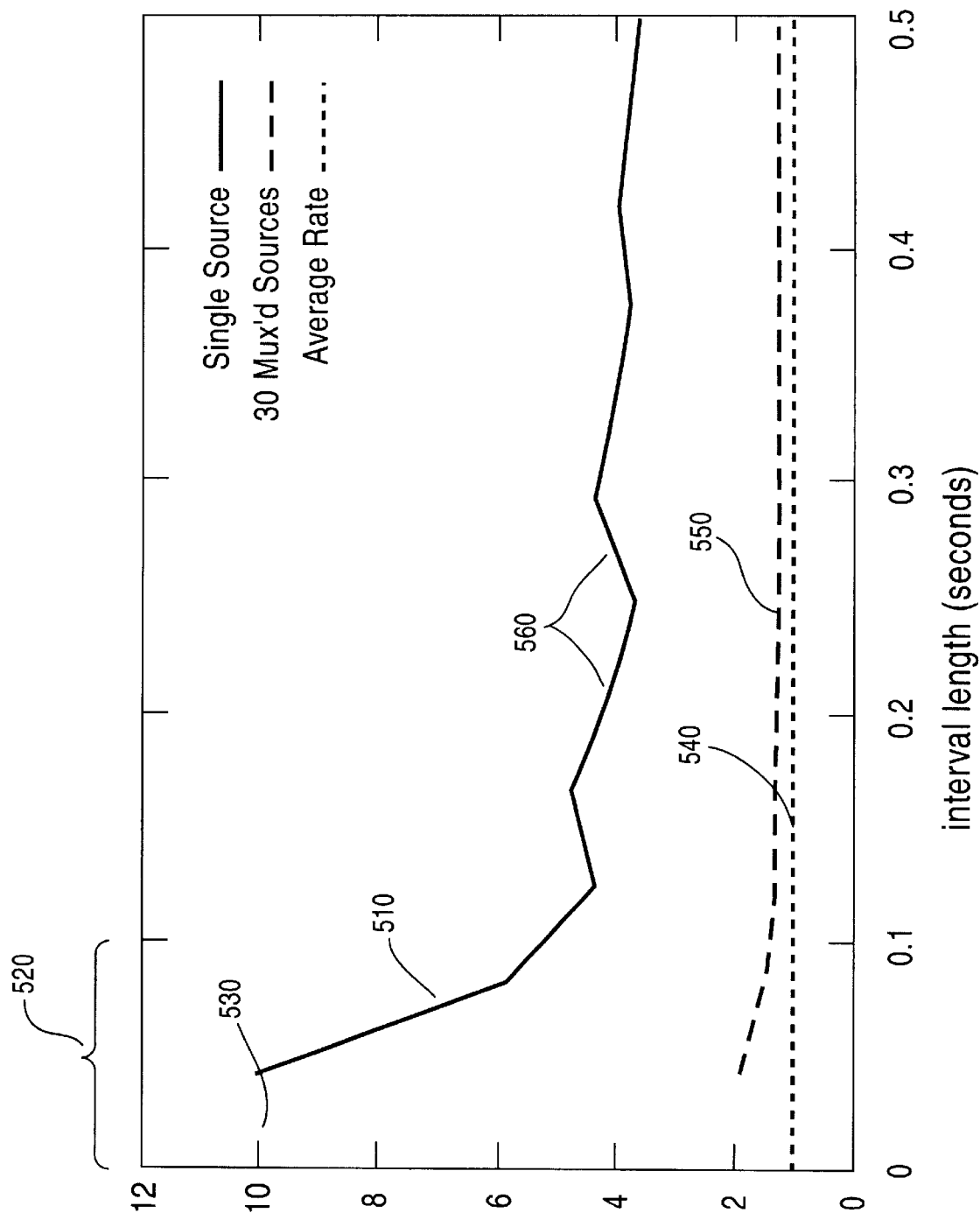
FIG. 5 depicts a plot of packet rate vs. interval length.

FIG. 5 depicts a plot of packet rate vs. interval length 500. In FIG. 5, a flow's maximal rate envelope normalized to the flow's mean rate for two scenarios. In FIG. 5, the upper curve 510 depicts the normalized envelope of a single 30-minute trace of an MPEG-compressed action movie. Plotting the bounding rate to mean ratio vs. the interval length, FIG. 5 shows how the traffic characterization captures the maximum rates and duration of the flow's bursts. For example, for small interval lengths 520, the envelope approaches the source's instantaneous peak rate 530, which is about 10 times of the mean rate 540. For longer interval lengths it decreases towards the long-term average rate, which is the total number of bits in the MPEG sequence divided by the length of the sequence.

The second curve 550 of FIG. 5 shows the normalized envelope of 30 multiplexed copies of this same trace. If all 30 flows are exactly synchronized, then this second curve would overlap exactly with the first 510. However, when the flows have statistically independent phases, the peaks of each flow do not line up exactly, and when normalized to the aggregate traffic's mean rate, the measured normalized envelope of the aggregate flow 550 is significantly less than that of the individual flow 510. Hence, even with a traffic characterization that describes the flow's maximal rates, the extent to which flows statistically multiplex is evident.

It can also be seen from FIG. 5 that the autocorrelation structure of the flow is revealed from the traffic envelope. For example, with a single flow, the source's alternation between large intra-coded frames and smaller inter-coded frames is evident from the shape of the normalized rate envelopes, with its sharp drop over one to two frame times and its oscillation 560 thereafter. However, when these video sources multiplexed, this quasi-periodicity is largely removed as evidenced by the near monotonicity of the envelope of the aggregate flow 550. Thus, as the number of flows increase, the normalized envelope of the aggregate traffic approaches the long-term average rate 540.

Finally, in addition to characterizing the extreme values of the traffic flow, which can be exploited for resource allocation, the maximal rate envelope has the desirable property that the variation of the maximum rate tends to be less than the variance of the flow itself.

Next, the measurement window T is set. With Equations (5) and (6), the applications' specified QoS will always be satisfied for any choice of the measurement window T, although a poorly set T only under-utilizes network resources. For a particular T, either the buffer test or stability condition will restrict the admission of a new flow, so that the admissible region is the smaller of the two admissible regions calculated from Equations (5) and (6).

Figure 6:
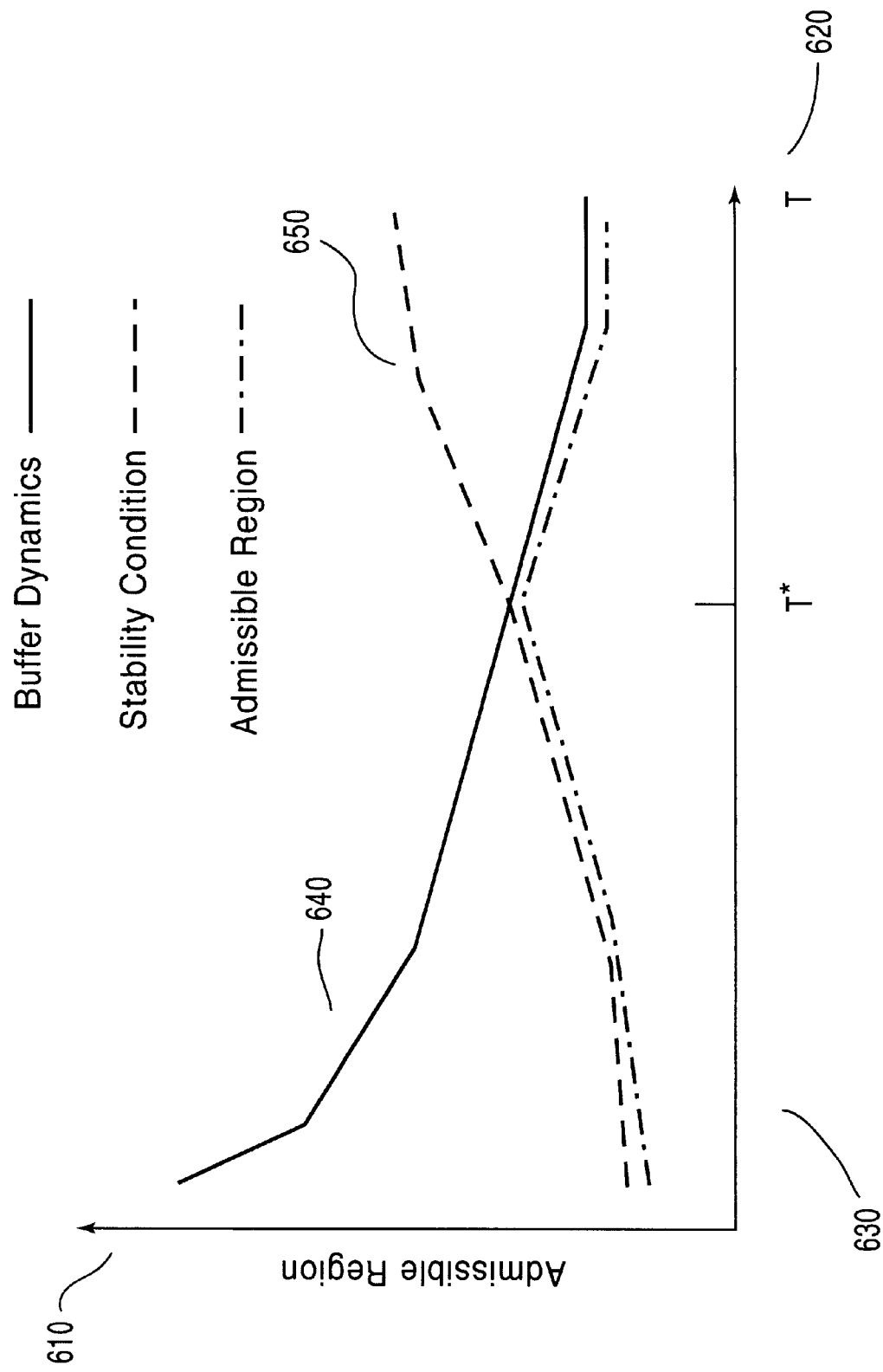
FIG. 6 illustrates the relationship between the admissible region and the measurement window T.

FIG. 6 illustrates the relationship between the admissible region 610 and the measurement window T 620. If T is set too small 630, σT, the variation of rate over intervals of length T, will be large 640, so that the stability condition cannot be satisfied. Alternatively, if T is set too large 650, the interval from which the maximum rate is measured is large, so that estimation of the maximal buffer occupancy will also be large. Consequently, the buffer test becomes the bottleneck. In between these two extremes, there exists an optimal T* 670, where the maximal admissible region is achieved.

Figure 7:
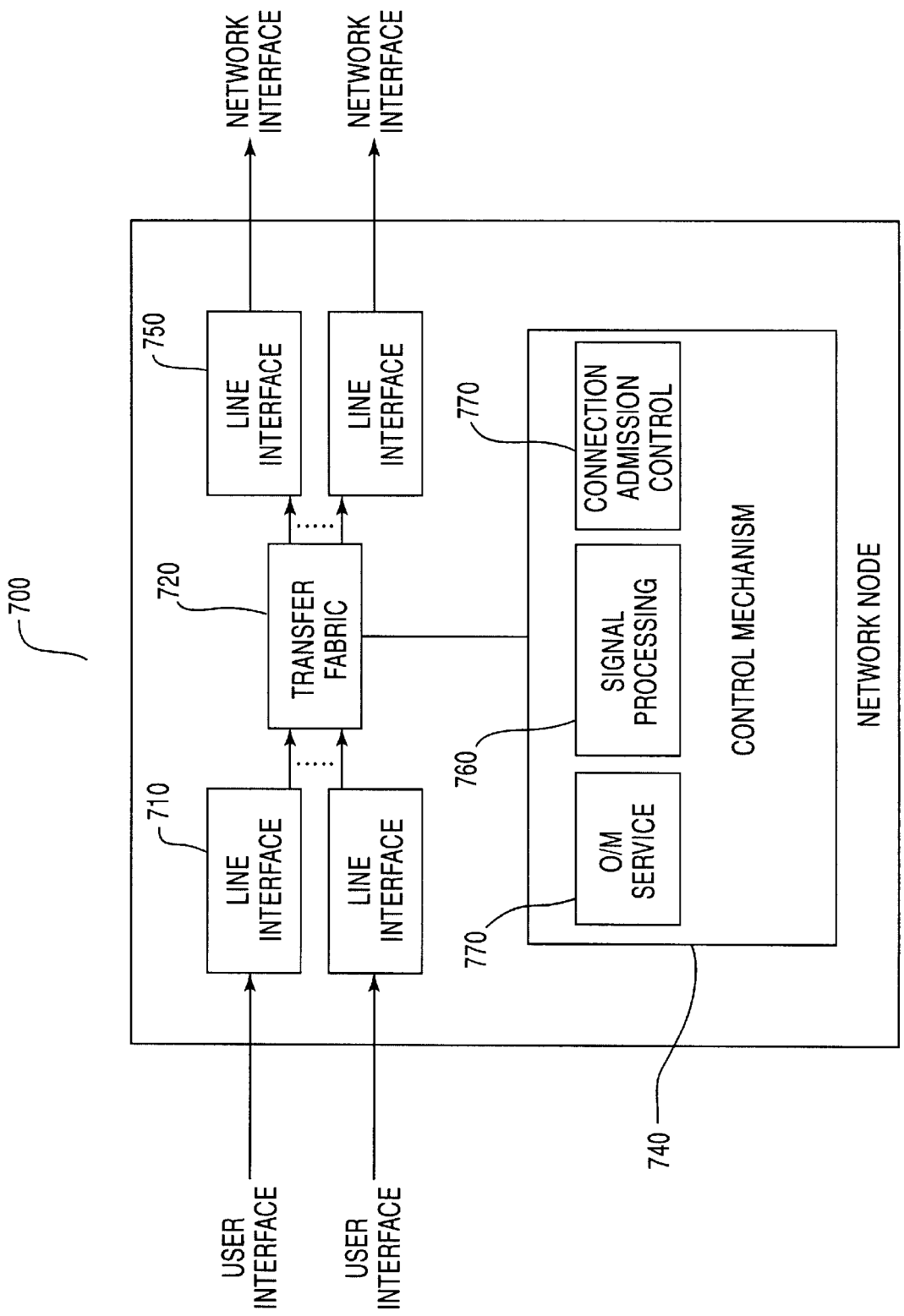
FIG. 7 illustrates a block diagram of a network node according to the present invention.

FIG. 7 illustrates a block diagram of a network node 700 according to the present invention. In FIG. 7, input line interfaces 710 connect the user with the transfer fabric 720. The transfer fabric 720 includes a buffered multiplexer (See FIG. 9) for statistically multiplexing multiple flows to optimize bandwidth utilization for each output connection. The switch fabric then connects to an output line interface 730 that provides the user access to other parts of the network (not shown). The transfer fabric 720 transfers the packets or cells to the appropriate output line interface. The switching node 700 also includes a control mechanism 740. The control mechanism 740 includes an operations and maintenance module 750 for gathering status information regarding the network, a signal processing module 760 for processing signals related to connection set-ups and connection releases, and a connection admission control module for accepting or denying connection requests.

Figure 8:
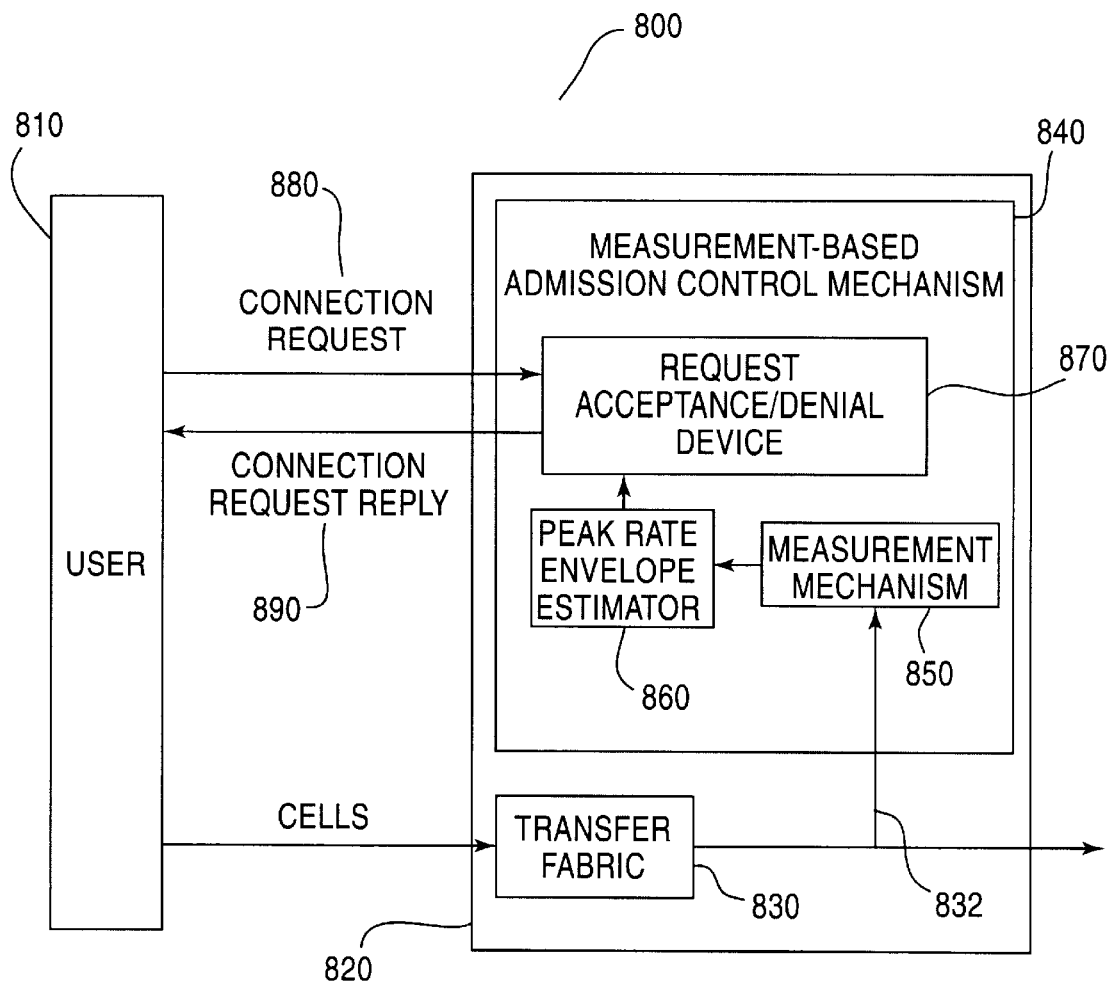
FIG. 8 illustrates a block diagram 800 of a network node 820 emphasizing the functions of the connection admission control module according to the present invention.

FIG. 8 illustrates a block diagram 800 of a network node 820 emphasizing the functions of the connection admission control module according to the present invention. In FIG. 8, a user 810 attempts to establish a connection via network node 820. Network node 820 includes a transfer fabric 830 for transferring cells to an appropriate output port. According to the present invention, a tap 832 of the output is provided to a measurement mechanism 850 of a measurement-based admission control mechanism 840. The measurement mechanism 850 gathers measurement data for the streams and provides the data to the peak rate envelope estimator 860 for characterization. The peak rate envelope estimator 860 uses empirical traffic envelopes of the aggregate traffic flow to allocate resources. A request acceptance/denial device 870 receives connection requests 880 from the user 810 and, based upon the empirical traffic envelopes of the aggregate traffic flow, sends a connection request reply 890 to the user indicating that the connection request was accepted or denied.

Figure 9:
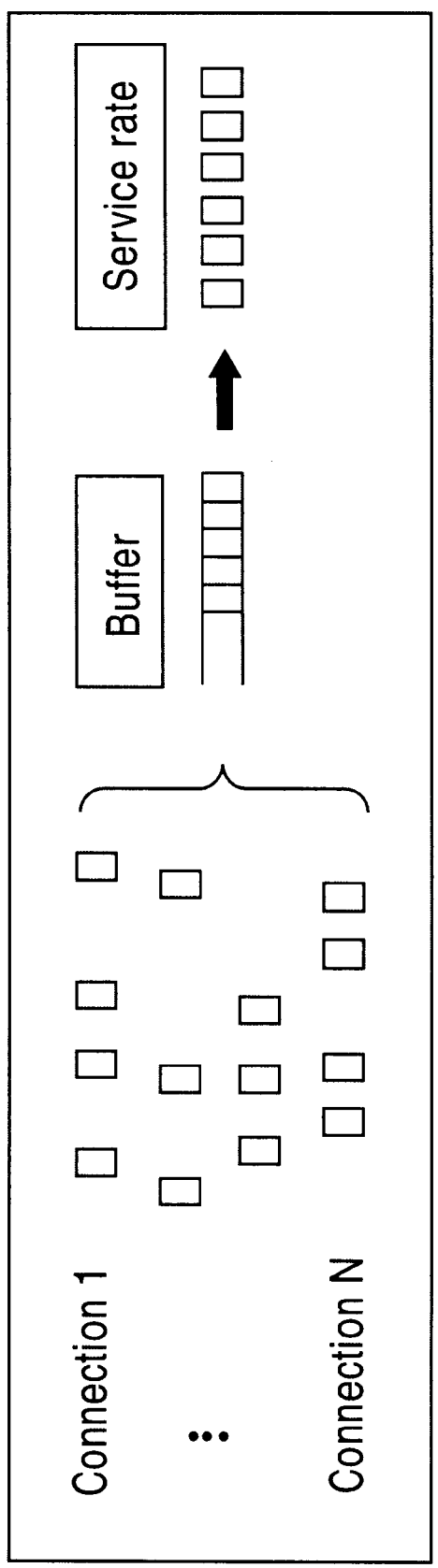
FIG. 9 illustrates a basic cell multiplexer with a shared first-in, first-out (FIFO) queue according to the present invention.

FIG. 9 illustrates a basic cell multiplexer 900 with a shared first-in, first-out (FIFO) queue according to the present invention. In FIG. 9, N connections 910 are multiplexed together. The packets are queued in a buffer 920. Then, the packets or cells in the queue 920 are transmitted according to the service rate 930.

Figure 10:
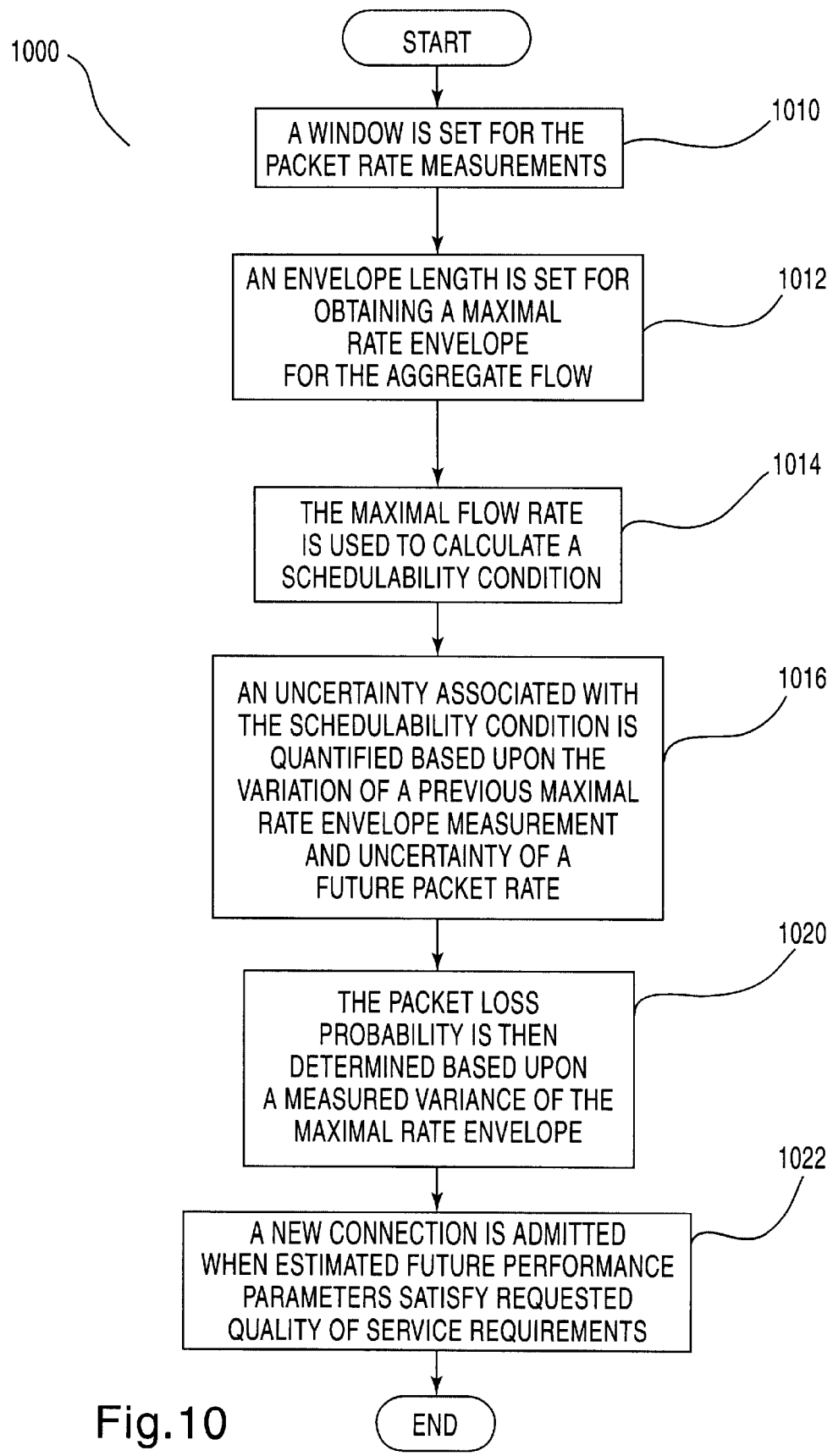
FIG. 10 illustrates a flow chart of the measurement-based admission control system using maximal rate envelopes according to the present invention.

FIG. 10 illustrates a flow chart 1000 of the measurement-based admission control system using maximal rate envelopes according to the present invention. In FIG. 10, a window is set for the packet rate measurements 1010. Then, an envelope length is set for obtaining a maximal rate envelope for the aggregate flow 1012. Thus, a packet rate of an aggregate flow is measured to obtain a maximal rate envelope. The maximal flow rate is used to calculate a schedulability condition 1014. An uncertainty associated with the schedulability condition is quantified based upon the variation of a previous maximal rate envelope measurement and uncertainty of a future packet rate 1016. The uncertainty of the future packet rate is based upon a packet loss probability reflecting a mean number of packets lost when the future arriving packet exceed a past measured maximal rate envelope.

Admission control for a new connection is determined based upon the obtained maximal rate envelope. First, using the aggregate schedulability condition with an associated prediction confidence level from step 1016, the packet loss probability is then determined based upon a measured variance of the maximal rate envelope 1020. A new connection is admitted when estimated future performance parameters satisfy requested quality of service requirements 1022. Future performance parameters satisfy requested quality of service requirements if an expected packet loss bounding rate is greater than a predetermined value when the aggregate schedulability condition with an associated confidence level fails to hold.

Figure 11:
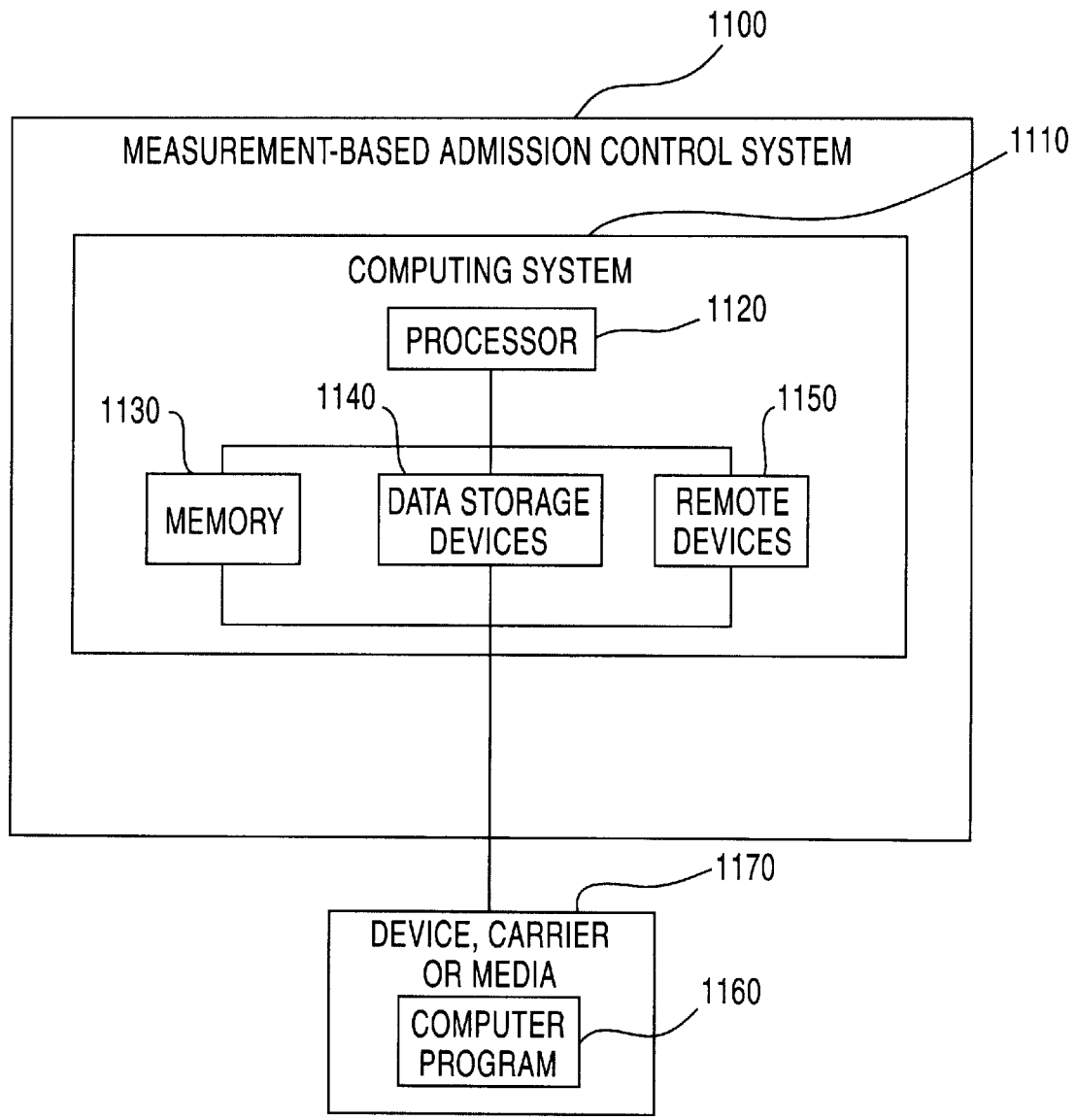
FIG. 11 is a block diagram that illustrates an exemplary hardware and software environment used to implement the preferred embodiment of the invention.

FIG. 11 is a block diagram that illustrates an exemplary hardware and software environment used to implement the preferred embodiment of the invention. The present invention includes measurement-base admission control system 1100 that is typically implemented using a computing system 1110. The computing system 1110 generally includes, inter alia, a processor 1120, memory 1130 (such as RAM) and data storage devices 1140. Those skilled in the art will recognize that any combination of the above components, or any number of different components, peripherals, and other devices, may be used.

The present invention is generally implemented using inter-related computer programs 1160 that may be executed by the processor 1120. All of the computer programs 1160 include instructions which, when read and executed by the processor 1120, causes the processor 1120 to perform the steps necessary to implement and/or use the present invention. Generally, the computer programs 1160 are tangibly embodied in and/or are readable from a device, carrier, or media 1170 by the memory 1130, data storage devices 1140, and/or remote devices 1150. The memory 1130, data storage devices 1140, and/or remote devices 1150 are coupled to the processor 1120.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media. Of course, those skilled in the art will recognize many modifications may be made to this configuration without departing from the scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A measurement-based admission control method for a network system multiplexing a plurality of connections into an aggregate flow, packets of the multiplexed connection being held in a buffer until transmission, comprising:

measuring a packet rate of an aggregate flow to obtain a maximal rate envelope; and performing admission control for a new connection based upon the maximal rate envelope, wherein the performing admission control further comprises using the maximal rate envelope to calculate a schedulability condition and admitting the new connection based upon the schedulability condition, quantifying an uncertainty associated with the schedulability condition, wherein the quantifying is based upon the variation of a previous maximal rate envelope measurement and uncertainty of a future packet rate.

2. The method of claim 1 wherein the uncertainty of the future packet rate is based upon a packet loss probability reflecting a mean number of packets lost when the future arriving packet exceed a past measured maximal rate envelope.

3. The method of claim 1 wherein the schedulability condition comprises a no packet loss condition for a new flow, bounded by $\pi_k$, k=1, ... T, requesting admission to a first-come-first-serve server with capacity C, buffer size B, and a workload characterized by a maximal rate envelope with mean $\overline{R}_k$ with variance $\sigma_k^2$, k=1, ... T, and a confidence level $\Phi(\alpha)$, the no packet loss condition defined according to $$\max_{k=1,2,\ldots,T-1} \{k\tau(\overline{R}_k + \alpha\sigma_k + \tau_k - C)\} \le B \text{ and } \overline{R}_T + \alpha\sigma_T + \tau_T \le C.$$

and $\overline{R}_T + \alpha\sigma_T + \tau_T \le C$.

4. The method of claim 3 wherein $$\max_{k=1,2,\ldots,T-1} \{k\tau(\overline{R}_k + \alpha\sigma_k + \tau_k - C)\} \le B$$

ensures that the maximal buffer occupancy is smaller than the buffer size.

5. The method of claim 3 wherein $\overline{R}_T + \alpha\sigma_T + \tau_T \le C$ is a stability condition for ensuring that the mean rate over intervals of length T is less than link capacity with confidence level $\Phi(\alpha)$, so that the busy period is less than T also with probability $\Phi(\alpha)$.

6. The method of claim 1, wherein the admission control comprises:

checking for an aggregate schedulability condition with an associated prediction confidence level;

determining the packet loss probability based upon a measured variance of the maximal rate envelope; and admitting a new connection when estimated future performance parameters satisfy requested quality of service requirements.

7. The method of claim 6 wherein future performance parameters satisfy requested quality of service requirements if an expected packet loss bounding rate is greater than a predetermined value when the aggregate schedulability condition with an associated confidence level fails to hold.

8. The method of claim 6 wherein the packet loss probability for an aggregate traffic flow that satisfies the schedulability condition $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C,$$

and has mean bounding rate $\overline{R}_k$ and variance $\sigma_k^2$ over intervals of length $k\tau$, for a link capacity C, buffer size B, and schedulability confidence level $\Phi(\alpha)$ is bounded by $$\max_{k=1,2,\ldots,T} \frac{\sigma_k \Psi(a) \cdot I_k}{\overline{R}_T \cdot T_\tau} \leq P_{loss} \leq \max_{k=1,2,\ldots,T} \frac{\sigma_k \Psi(a)}{\overline{R}_T}, \text{ where}$$

$$\Psi(a) = \delta_0 e^{-\frac{a-\lambda_0}{\delta_0}}.$$

9. The method of claim 1 wherein the maximal rate envelope captures an aggregate flow's interval based behavior.

10. The method of claim 1 wherein the measuring the packet rate updates a recent aggregate envelope and quantifies a temporal variation for the maximal rate envelope.

11. The method of claim 1 wherein the measuring the packet rate further comprising setting an interval length for flow rate measurements and determining a peak packet rate over the set interval length.

12. A measurement-based admission control apparatus, comprising:
   a measurement device for measuring a packet rate for an aggregate flow;
   a connection request processor for communicating acceptance and denial or connection requests; and
   a peak rate envelope estimator, disposed between the measurement device and the connection request processor, for determining a maximal rate envelope and signaling the connection request processor to accept or deny a request for a new connection based upon the maximal rate envelope,
   wherein the signaling the connection request processor to accept or deny a request for a new connection based upon the maximal rate envelope further comprises calculating a schedulability condition based upon the maximal rate envelope and admitting the new connection based upon the schedulability condition,
   quantifying an uncertainty associated with the schedulability condition,
   wherein the quantifying is based upon the variation of a previous maximal rate envelope measurement and uncertainty of a future packet rate.

13. The measurement-based admission control apparatus of claim 12 wherein the uncertainty of the future packet rate is based upon a packet loss probability reflecting a mean number of packets lost when the future arriving packet exceed a past measured maximal rate envelope.

14. The measurement-based admission control apparatus of claim 12 wherein the schedulability condition comprises a no packet loss condition for a new flow, bounded by $\pi_k, k=1, \ldots T$, requesting admission to a first-come-first-serve server with capacity C, buffer size B, and a workload characterized by a maximal rate envelope with mean $\overline{R}_k$ with variance $\sigma_k^2, k=1, \ldots, T$, and a confidence level $\Phi(\alpha)$, the no packet loss condition defined according to $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C.$$

and $\overline{R}_T + \alpha\sigma_T + \tau_T \leq C$.

15. The measurement-based admission control apparatus of claim 14 wherein $$\max_{k=1,2,\ldots,T-1} \{k\tau(\overline{R}_k + \alpha\sigma_k + \tau_k - C)\} \leq B$$

ensures that the maximal buffer occupancy is smaller than the buffer size.

16. The measurement-based admission control apparatus of claim 14 wherein $\overline{R}_T + \alpha\sigma_T + \tau_T \leq C$ is a stability condition for ensuring that the mean rate over intervals of length T is less than link capacity with confidence level $\Phi(\alpha)$, so that the busy period is less than T also with probability $\Phi(\alpha)$.

17. The measurement-based admission control apparatus of claim 12 wherein the admission control comprises:
   checking for an aggregate schedulability condition with an associated prediction confidence level;
   determining the packet loss probability based upon a measured variance of the maximal rate envelope; and
   admitting a new connection when estimated future performance parameters satisfy requested quality of service requirements.

18. The measurement-based admission control apparatus of claim 17 wherein future performance parameters satisfy requested quality of service requirements if an expected packet loss bounding rate is greater than a predetermined value when the aggregate schedulability condition with an associated confidence level fails to hold.

19. The measurement-based admission control apparatus of claim 17 wherein the packet loss probability for an aggregate traffic flow that satisfies the schedulability condition $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C.$$

and $\overline{R}_T + \alpha\sigma_T + \tau_T \leq C$, and has mean bounding rate $\overline{R}_k$ and variance $\sigma_k^2$ over intervals of length $k\tau$, for a link capacity C, buffer size B, and schedulability confidence level $\Phi(\alpha)$ is bounded by $$\max_{k=1,2,\ldots,T} \frac{\sigma_k \Psi(a) \cdot I_k}{\overline{R}_T \cdot T_\tau} \leq P_{loss} \leq \max_{k=1,2,\ldots,T} \frac{\sigma_k \Psi(a)}{\overline{R}_T}, \text{ where}$$

$$\Psi(a) = \delta_0 e^{-\frac{a-\lambda_0}{\delta_0}}.$$

20. The measurement-based admission control apparatus of claim 12, wherein the maximal rate envelope captures an aggregate flow's interval based behavior.

21. The measurement-based admission control apparatus of claim 12, wherein the measuring the packet rate updates a recent aggregate envelope and quantifies a temporal variation for the maximal rate envelope.

22. The measurement-based admission control apparatus of claim 12, wherein the measuring the packet rate further comprising setting an interval length for flow rate measurements and determining a peak packet rate over the set interval length.

23. An article of manufacture comprising one or more computer program products tangibly embodying one or more computer programs that when read by one or more computers causes the computers to perform a method for empirically measuring aggregate flow traffic to perform admission control, the method comprising:
   measuring a packet rate of an aggregate flow to obtain a maximal rate envelope; and
   performing admission control for a new connection based upon the maximal rate envelope wherein the performing admission control further comprises using the maximal rate envelope to calculate a schedulability condition and admitting the new connection based upon the schedulability condition, quantifying an uncertainty associated with the schedulability conditions, wherein the quantifying is based upon the variation of a previous maximal rate envelope measurement and uncertainty of a future packet rate.

24. The article of manufacture of claim 23 wherein the uncertainty of the future packet rate is based upon a packet loss probability reflecting a mean number of packets lost when the future arriving packet exceed a past measured maximal rate envelope.

25. The article of manufacture of claim 23, wherein the schedulability condition comprises a no packet loss condition for a new flow, bounded by $\pi_k$, k=1, . . . T, requesting admission to a first-come-first-serve server with capacity C, buffer size B, and a workload characterized by a maximal rate envelope with mean $\overline{R}_k$ with variance $\sigma_k^2$, k=1, . . . ,T, and a confidence level $\Phi(\alpha)$, the no packet loss condition defined according to $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C.$$

and $\overline{R}_T + \alpha\sigma_T + \tau_T \leq C$.

26. The article of manufacture of claim 25 wherein $$\max_{k=1,2,\ldots,T-1} \{k\tau(\overline{R}_k + \alpha\sigma_k + \tau_k - C)\} \leq B,$$

ensures that the maximal buffer occupancy is smaller than the buffer size.

27. The article of manufacture of claim 25 wherein $\overline{R}_T + \alpha\sigma_T + \tau_T \leq C$ is a stability condition for ensuring that the mean rate over intervals of length T is less than link capacity with confidence level $\Phi(\alpha)$, so that the busy period is less than T also with probability $\Phi(\alpha)$.

28. The article of manufacture of claim 23, wherein the admission control comprises:

checking for an aggregate schedulability condition with an associated prediction confidence level;

determining the packet loss probability based upon a measured variance of the maximal rate envelope; and admitting a new connection when estimated future performance parameters satisfy requested quality of service requirements.

29. The article of manufacture of claim 28 wherein future performance parameters satisfy requested quality of service requirements if an expected packet loss bounding rate is greater than a predetermined value when the aggregate schedulability condition with an associated confidence level fails to hold.

30. The article of manufacture of claim 28 wherein the packet loss probability for an aggregate traffic flow that satisfies the schedulability condition $$\max_{k=1,2,\ldots,T-1} \{k\tau(\overline{R}_k + \alpha\sigma_k + \tau_k - C)\} \leq B \text{ and } \overline{R}_T + \alpha\sigma_T + \tau_T \leq C.$$

and $\overline{R}_T + \alpha\sigma_T + \tau_T \leq C$, and has mean bounding rate $\overline{R}_k$ and variance $\sigma_k^2$ over intervals of length $k\tau$, for a link capacity C, buffer size B, and schedulability confidence level $\Phi(\alpha)$ is bounded by $$\max_{k=1,2,\ldots,T} \frac{\sigma_k \Psi(a) \cdot I_k}{\overline{R}_T \cdot T_\tau} \leq P_{loss} \leq \max_{k=1,2,\ldots,T} \frac{\sigma_k \Psi(a)}{\overline{R}_T}, \text{ where}$$

$$\Psi(a) = \delta_0 e^{-\frac{a-\lambda_0}{\delta_0}}.$$

31. The article of manufacture of claim 23, wherein the maximal rate envelope captures an aggregate flow's interval based behavior.

32. The article of manufacture of claim 23, wherein the measuring the packet rate updates a recent aggregate envelope and quantifies a temporal variation for the maximal rate envelope.

33. The article of manufacture of claim 23, wherein the measuring the packet rate further comprising setting an interval length for flow rate measurements and determining a peak packet rate over the set interval length.

* * * * *